Sept. 11, 1934.  W. W. ROTHENHOEFER  1,973,017
BRAKE FOR AEROPLANES
Filed June 24, 1932
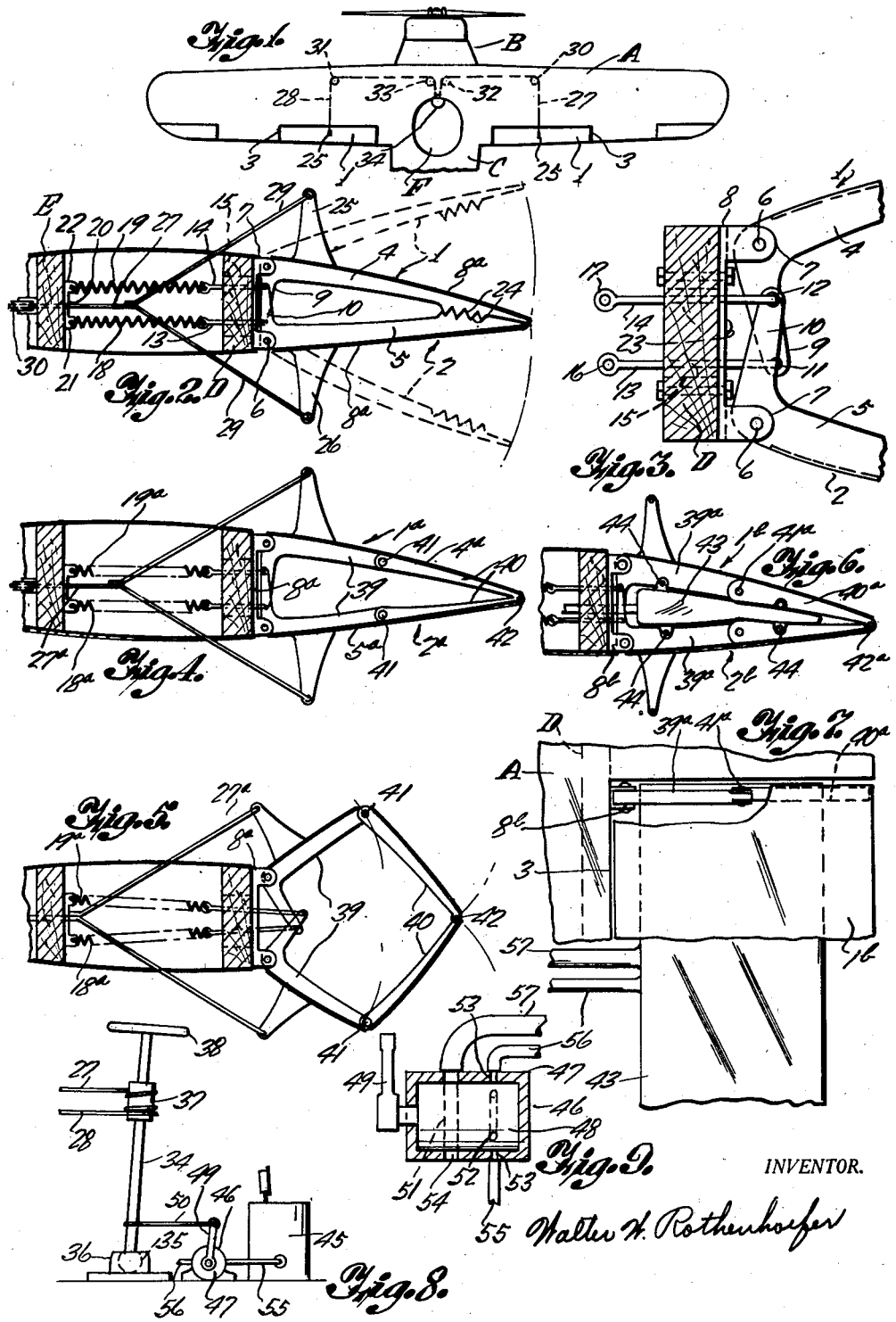
INVENTOR.
Walter W. Rothenhoefer Patented Sept. 11, 1934

1,973,017

UNITED STATES PATENT OFFICE 1,973,017

BRAKE FOR AEROPLANES

Walter W. Rothenhoefer, St. Louis, Mo.

Application June 24, 1932, Serial No. 619,057

7 Claims. (Cl. 244—29)

My invention relates to brakes for aeroplanes, and the main object is to provide a means whereby the speed of an aeroplane may be retarded just prior to and upon landing or at any other time either in flight or while moving over the ground where such action may be desirable.

Another object is to provide a braking means for aeroplanes which is associated with or built in the wing or wings of the aeroplane and arranged to increase the drag or wind resistance thereof to afford a braking action, the braking means for this purpose comprising hinged or pivoted brake panels, flaps or wing sections which may be swung or projected out into the air stream flowing along the surfaces of the wings to offer a resistance to this air and retard the speed of the aeroplane.

Another object is to provide a braking means for aeroplanes which, as aforesaid, comprises brake panels, flaps or wing sections hinged to the aeroplane wing or wings and in which the said panels, flaps or sections are located at each side of the fuselage and are arranged to be operated either independently or simultaneously whereby to provide an uneven or even drag or resistance, the former being particularly of use in making a turn either in flight or on the ground, and further being of advantage in landing on a hillside or uneven ground, as will be understood.

A further object is to provide an aeroplane braking means of this kind, including an efficient operating mechanism and a compressed air operated means for cushioning the brake panels, wing flaps or sections as they are closed or swung to their inoperative position and to aid in holding the members in this position.

Still a further object is to provide an aeroplane brake of the kind described in a simple and efficient form and of relatively light weight.

The foregoing and other objects, together with means whereby the same may be carried into effect, will best be understood from the following description of my invention, taken in connection with the accompanying drawing, wherein Figure 1 is a plan view of the frontal portion of an aeroplane equipped with my invention.

Figure 2 is an enlarged cross section through the rear portion of the wing of an aeroplane, showing my invention in place therein.

Figure 3 is a further enlarged fragmentary side view showing the frontal portion of the brake panels and the hinge and spring connections thereof, the said brake panels being shown as swung partially open.

Figure 4 is a view similar to Figure 2, but showing a modification of my invention.

Figure 5 is a view similar to Figure 4, but showing my invention in its braking or operative position.

Figure 6 is a view similar to Figures 2 and 4, but showing yet a further modification of my invention, employing an air cushion and lock.

Figure 7 is a fragmentary plan view of the structure shown in Figure 6.

Figure 8 is a side elevation of the control mechanism for the brakes and the air valve and tank used in connection with the air cushion shown in Figures 6 and 7.

Figure 9 is an enlarged cross section through the air valve shown in Figure 8.

In carrying out my invention in the embodiment shown in Figures 1, 2 and 3 of the drawing, I provide a pair of complementary brake panels, wing sections or flaps 1 and 2 of any suitable length and width and adapted to fit freely within recesses 3 cut in the wing 4 of the aeroplane B at each side of the fuselage C, said recesses 3 preferably, though not necessarily, being provided in the trailing edge of the wing as shown. Each brake panel 1 and 2 comprises end ribs 4 and 5 which enter within and are hinged by pins 6 between the spaced apertured ears 7 of hinge brackets 8, which are secured to the rear face of the spar D, which is a part of the usual wing assembly and which defines the forward margins of the said recesses 3. Between these end ribs 4 and 5 of the panels 1 and 2 may be located the usual intermediate ribs (not shown) and the whole covered with the usual fabric or other covering 8a, the construction of the panels being similar to that of the usual aeroplane wing and being, of course, susceptible of any desired modification with only the requirement that the resulting panels be hinged at their forward margins in the recesses 3. The two panels 1 and 2 at each side of the wing are disposed one above the other and are of such cross sectional contour that they will when closed fill out and lie flush with the plane of the trailing edge of the wing.

Spring arms or fingers 9 and 10 are turned inwardly at substantially right angles from the inner or forward ends of the ribs 4 and 5 of the brake panels 1 and 2, and are arranged in overlapping or interdigitating relationship to rest side by side and clear of each other when the panels are in their closed position as shown, the said arms being formed integrally with or attached to the said ribs 4 and 5 as desired. At their ends the spring arms 9 and 10 have apertures 11 and 12, in which are hooked the ends of rods 13 and 14, which extend forwardly and freely through apertures 15 in the spar D and terminate in eyes 16 and 17. Retractile coil springs 18 and 19 are hooked at their rear ends in the eyes 16 and 17 and extend forwardly within the wing A and are attached at their forward ends to spring brackets 20 having apertured ears 21 and 22 for this purpose, and which are secured to another spar E of the wing A forwardly of the spar D. The springs 18 and 19 are tensioned to normally hold the brake panels 1 and 2 closed as will be understood, and in this position the forward faces of the spring arms 9 and 10 engage bosses or rests 23 struck out from the hinge brackets 8 to prevent any play or rattle of the parts. As a further aid in holding the panels 1 and 2 rigidly together in their closed position, the meeting edges of the ribs 4 and 5 are toothed or serrated at 24 adjacent their rear ends, as shown in Figure 2.

The usual horns or arms 25 and 26 are extended outwardly from the brake panels 1 and 2, as shown, and operating cables 27 and 28 are provided for operation of the panels, the said cables being divided at their outer ends at 29 and attached to the horns 25 and 26. The cables are then directed forwardly in the wing and are trained over pulleys 30 and 31, and thence inwardly and are trained over pulleys 32 and 33, from which they extend into the pilot's cockpit or compartment F. A control stick 34 is provided convenient to the hand of the pilot and has a ball 35 at its lower end seated in a ball socket 36 secured to the floor of the cockpit F and has a cable drum 37 at some distance from its lower end. The inner ends of the cables 27 and 28 are secured to and coiled in opposite directions around this drum as shown.

In operation the pilot may by pulling directly back on the control stick 34 exert a pull on the cables 27 and 28 which, transmitted to the horns 25 and 26, will swing the brake panels 1 and 2 apart and outward as shown in dotted lines in Figure 2. A considerable drag or resistance to the flow of air past the wing A is thus afforded by the brake panels 1 and 2 and the speed of the aeroplane is retarded, this braking action being of particular advantage in landing the aeroplane since it is possible to land at a much lower speed. In addition, the speed of the aeroplane may be retarded in flight or while moving over the ground whenever necessary or desirable.

Should the pilot desire to open the brake panels 1 and 2 on only one side of the wing and so cause an uneven drag to facilitate turning in the air or on the ground or landing on sloping ground, he may rotate the wheel 38 at the top of the control stick 35 and wind one cable 27 or 28 on the drum 37, while the other is unwound, the cable wound on the drum, of course, pulling open the brake panels to which it is attached.

In the embodiment of my invention shown in Figures 4 and 5, the brake panels 1a and 2a are hinged in the wing recesses by the brackets 8a, are normally held closed by the springs 18a and 19a and are operated by the cables 27a and 28a, only one of which (27a) is shown, and the operation is identically as described above. In this embodiment, however, the ribs 4a and 5a are each formed of a forward section 39 and a rear or tail section 40 hinged together along a medial line of the panels at 41 and the tail sections 40 of each panel hinged together at their rear or trailing edges, as shown at 42. In this construction the panels 1 and 2 as they are swung open "break" or hinge along a medial line, as shown in Figure 5, and assume a somewhat diamond-shaped form. The panels in this position, of course, form a resistance to the air flow to afford the braking action desired and all the advantages obtained by this action are present in this arrangement as well as that first described. In addition, the rear sections 40 of the panels when opened move forwardly and apart and into a position in which they will support and brace the forward sections against the air streams flowing past the wings, as will be clearly evident in Figure 5.

In the embodiment of my invention shown in Figures 6 and 7, the brake panels 1b and 2b are constructed and arranged exactly as shown in Figures 4 and 5 and the ribs thereof each include a forward section 39a and a rear section 40a hinged together at 41a along a medial line and hinged at their rear edges at 42a. The panels 1b and 2b, are, of course, hinged at their forward edges in the hinge brackets 8b and are opened by the operating cables and normally held closed by the springs (not shown) as described. Air bags or cushions 43 are placed between the ribs of the panels 1b and 2b and secured thereto in any suitable manner, as for instance, by tabs 44 formed on the bags and attached to the ribs as shown. One bag 43 is mounted between each set of panels 1b and 2b and extends substantially from end to end thereof. A compressed air tank 45 is mounted in the fuselage C of the aeroplane in any desired location and serves as a storage for compressed air which may be pumped therein by a hand pump or other compressor (not shown). A control valve 46 is mounted in the cockpit F adjacent and preferably rearwardly of the control stick 34 and this valve comprises a casing or housing 47 and a rotor 48 journaled therein. A lever 49 is secured to an end of the rotor 48 outwardly of the housing and is connected by a link 50 to the operating stick 34, as shown in Figure 8, the said link being bent or coiled around the control stick as shown, to allow the aforesaid rotation thereof in operating the brake panels independently. The rotor 48 has a diametrically extended intake passage 51 and a relatively larger and also diametrically extended exhaust passage 52, the two passages being located with their axes at an angle or extended through the rotor at different angles for a purpose to be described. The housing 47 has diametrically opposite intake and exhaust ports 53 and 54 in each side and in alignment with the said passages 51 and 52. A pipe or tube 55 leads from the tank 45 to the intake port 53 in one side of the housing 47, and a pipe 56 leads from the port 53 in the other side outward to the air bag 43. An exhaust pipe 57 extends from the air bag 43 to the exhaust port 54 in one side of the housing, it being understood that the pipes 56 and 57 are of course divided to run to each of the bags 43 on each side of the wing.

The foregoing arrangement is such that with the control stick 34 in its neutral position and while the brake panels 1b and 2b are closed, the exhaust passage 52 registers with the exhaust ports 54, while the intake passage 51 lies out of registry with the intake ports 53. Only the normal atmospheric air pressure is thus present in the bags 43, and they lie substantially flat as shown. Now as the control stick 34 is pulled back to swing the brake panels 1b and 2b apart the rotor 48, will be rotated in a clockwise direction as viewed in Figure 8, by the action of the lever 49 and link 50, and the exhaust passage 52 will move out of registry with the ports 54 while the intake passage 51 will move into registry with the ports 53, and compressed air from the tank 45 will then flow into the bags 43. The bags will thus be distended as the brake panels 1b and 2b swing apart. As the control stick 34 is released and returns to its normal position, the intake passage will again be closed and the exhaust passage opened and the compressed air in the bags 43 will be pressed out by the closing brake panels and these panels will be cushioned and restrained against too sudden closing by the bags as the air escapes. In addition the bags when emptied of the air will act to hold the wing panels tightly together as will be understood.

While I have herein set forth certain preferred embodiments of my invention, it is understood that I may vary from the same in minor structural details, so as best to construct a practical device for the purpose intended, not departing from the spirit of the invention and within the scope of the appended claims.

I claim:

1. In a brake for aeroplanes, in combination with a wing having a recess, a pair of complementary brake panels hinged at their forward ends in the recess and adapted to swing apart out of the recess, spring-set means for normally holding both panels closed together, the meeting faces of the panels adjacent their rear free edges having angular pointed teeth adapted to mesh in the closed positions of the panels.

2. In a brake for aeroplanes, in combination with a wing having a recess, a pair of complementary brake panels arranged one above the other in the recess and comprising ribs hinged at their forward ends to the wing, fingers formed on the forward ends of the ribs and turned inwardly in overlapping relation, retractile coil springs secured to the wing forwardly of the recess and extended rearwardly and connected to the ends of the said fingers on the ribs, and means for swinging the brake panels apart against the tension of the springs.

3. In a brake for aeroplanes, in combination with a wing having a recess, hinge brackets secured to the wing within the forward margin of the recess, a pair of complementary brake panels arranged one above the other in the recess and including ribs hinged at their forwardly disposed ends to the said hinge brackets, fingers extended inwardly in overlapping relation from the forward ends of the ribs, the said fingers being adapted to bear against the hinge brackets in the closed position of the panels, rods secured to the ends of the fingers and extended forwardly in the wing, and retractile coil springs stretched between the rods and forwardly located points in the wing.

4. In a brake for aeroplanes, in combination with a wing having a recess, a pair of brake panels hinged at their forward margins to the wing in the recess and adapted to swing apart, each of said panels including hinged rear sections adapted to move forwardly and swing apart to brace the panels in their opened position.

5. In a brake for aeroplanes, in combination with a wing having a recess, a pair of panels mounted in the recess and comprising forward sections hinged at their forward edges to the wing and adapted to open outward, and rear sections connected to the forward sections and hinged together at their rear margins whereby they may move forwardly and open outwardly to brace the forward sections as they open.

6. In a brake for aeroplanes, in combination with a wing having a recess in its trailing edge, a pair of brake panels mounted in the recess and comprising front and rear sections hinged together, the said front sections being hinged at their forward margins to the forward margins of the recess and adapted to swing apart and carry the rear sections fowardly in the recess.

7. In a brake for aeroplanes, in combination with a wing having a recess in its trailing edge, a pair of brake panels mounted in the recess and comprising front and rear sections hinged together, the said front sections being hinged at their forward margins to the forward margins of the recess and adapted to swing apart and carry the rear sections forwardly in the recess, the said rear panel sections being hinged together at their rear margins whereby to brace and support the forward sections in their opened position.

WALTER W. ROTHENHOEFER.